(12) United States Patent
Stonner et al.

(10) Patent No.: US 12,075,755 B2
(45) Date of Patent: Sep. 3, 2024

(54) LUBRICATED PET NAIL GRINDER

(71) Applicants: Claire Marie Stonner, Saint Louis, MO (US); Ellen Elizabeth-Diane Stonner, Chicago, IL (US)

(72) Inventors: Claire Marie Stonner, Saint Louis, MO (US); Ellen Elizabeth-Diane Stonner, Chicago, IL (US)

( * ) Notice: Subject to any disclaimer, the term of this patent is extended or adjusted under 35 U.S.C. 154(b) by 0 days.

(21) Appl. No.: 18/105,833

(22) Filed: Feb. 4, 2023

(65) Prior Publication Data
US 2024/0260540 A1 Aug. 8, 2024

(51) Int. Cl.
*A01K 13/00* (2006.01)
(52) U.S. Cl.
CPC .................... *A01K 13/00* (2013.01)
(58) Field of Classification Search
CPC ......... A01K 13/00; A45D 29/05; A45D 29/04
USPC .......................................... 119/601
See application file for complete search history.

(56) References Cited

U.S. PATENT DOCUMENTS

| | | | | |
|---|---|---|---|---|
| 5,819,757 A | * | 10/1998 | Baekkelund | A45D 29/05 132/75.6 |
| D937,502 S | * | 11/2021 | Cran | D30/158 |
| 2007/0186867 A1 | * | 8/2007 | Mulloy | A01K 13/00 119/609 |
| 2009/0283052 A1 | * | 11/2009 | Drelinger | A45D 29/05 119/610 |
| 2018/0055540 A1 | * | 3/2018 | Yiu | A61B 17/54 |

\* cited by examiner

*Primary Examiner* — Yvonne R Abbott-Lewis

(57) ABSTRACT

Disclosed herein are methods and systems for implementing a Lubricated Pet Nail Grinder (LPNG). One embodiment takes the form of a LPNG that includes a housing handle, a support portion affixed on a top portion of the housing handle and a through hole extending vertically through the top portion of the housing handle and the bottom portion of the housing handle, a hose extending through the through hole of the housing handle, wherein the hose comprises a connector affixed to a first end of the hose extending through the bottom portion of the housing handle and an actuator affixed to a second end of the hose extending through the top portion of the housing handle, a lubricant, a lubricant source, a cylindrical roller axially mounted on the support portion of the housing handle, a motor mounted within the interior of the housing handle, a nail-pad separator affixed to a rear side of the support portion of the housing handle, and a shield affixed to a font side of the support portion of the housing handle.

20 Claims, 8 Drawing Sheets

LUBRICATED PET NAIL GRINDER

BACKGROUND OF THE INVENTION

Pets have very large nails that grow quickly and need to be cut often. However, some nails are difficult to clip due to their size and are sensitive, so it is easier to use a nail grinder in much the same manner as a dremel to shorten these nails.

When doing this, pets usually try to lick the grinder while in use, and we found it was to keep the grinder wet and prevent heating up as much due to friction. Since then, we have held running water over the grinder while trimming the pet's nails and the pet is calmer. An additional benefit of water is that it traps dust from the nail-grinding process and prevents irritation of the pet's and human user's airways.

Accordingly, there is a need for a Lubricated Pet Nail Grinder (LPNG).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
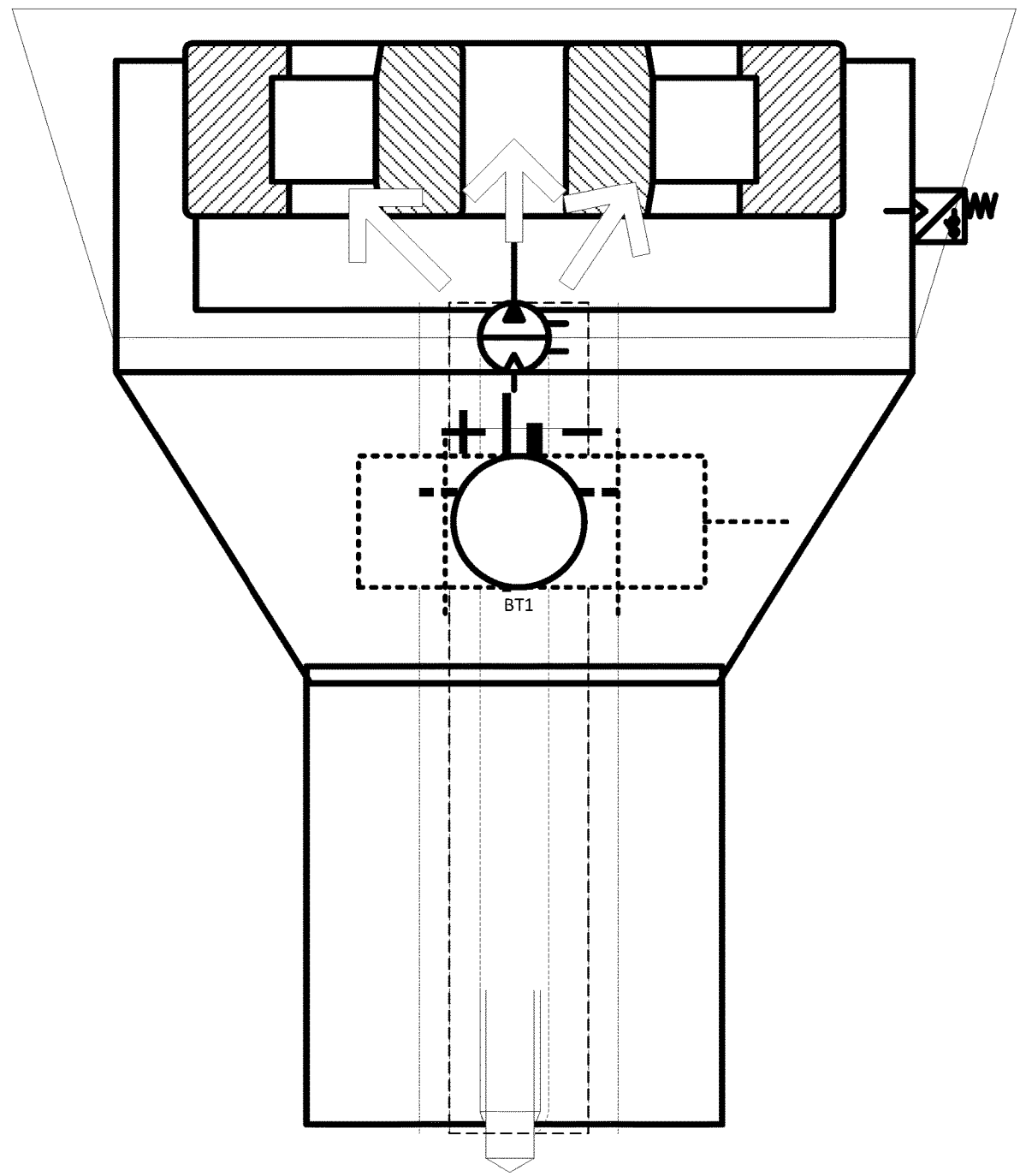
FIG. 1 depicts an example of a LPNG, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment takes the form of a LPNG, a method, or an article of manufacture that includes a housing handle. The LPNG also includes a support portion affixed on a top portion of the housing handle and a through hole extending vertically through the top portion of the housing handle and the bottom portion of the housing handle. The LPNG also includes a hose extending through the through hole of the housing handle, wherein the hose comprises a connector affixed to a first end of the hose extending through the bottom portion of the housing handle and an actuator affixed to a second end of the hose extending through the top portion of the housing handle. The LPNG also includes a lubricant substance and a lubricant source. The LPNG also includes a cylindrical roller axially mounted on the support portion of the housing handle. The LPNG also includes a motor mounted within the interior of the housing handle. The LPNG also includes a power source connected to the motor and a trigger mechanism attached to the housing handle. The LPNG also includes a nail-pad separator affixed to a rear side of the support portion of the housing handle and a shield affixed to a font side of the support portion of the housing handle.

In at least one embodiment, the connector affixed to the second end of the hose connects to a lubricant source.

In at least one embodiment, the actuator affixed to the first end of the hose intensifies the lubricant from the lubricant source.

In at least one embodiment, the cylindrical roller is propelled by a motor.

In at least one embodiment, the cylindrical roller is comprised of an abrasive surface.

In at least one embodiment, the cylindrical roller is comprised of a polishing surface.

In another embodiment, the detach mechanism detaches the cylindrical roller from the support portion of the housing handle.

In at least one embodiment, the motor facilitates forward motion.

In at least one embodiment, the motor facilitates reverse motion.

In at least one embodiment, the trigger mechanism activates the motor.

In at least one embodiment, the nail-pad separator provides nail pad separation during operation of the cylindrical roller.

In at least one embodiment, the shield protects from debris.

FIG. 1 depicts an example of a LPNG in accordance with some embodiments. In particular, FIG. 1 depicts a housing handle including a support portion affixed on a top portion of the housing handle and a through hole extending vertically through the top portion of the housing handle and the bottom portion of the housing handle. A hose extending through the through hole of the housing handle, wherein the hose comprises a connector affixed to a first end of the hose extending through the bottom portion of the housing handle and an actuator affixed to a second end of the hose extending through the top portion of the housing handle. A lubricant and a lubricant source. A cylindrical roller axially mounted on the support portion of the housing handle. A motor mounted within the interior of the housing handle. A nail-pad separator affixed to a rear side of the support portion of the housing handle and a shield affixed to a font side of the support portion of the housing handle.

Figure 2:
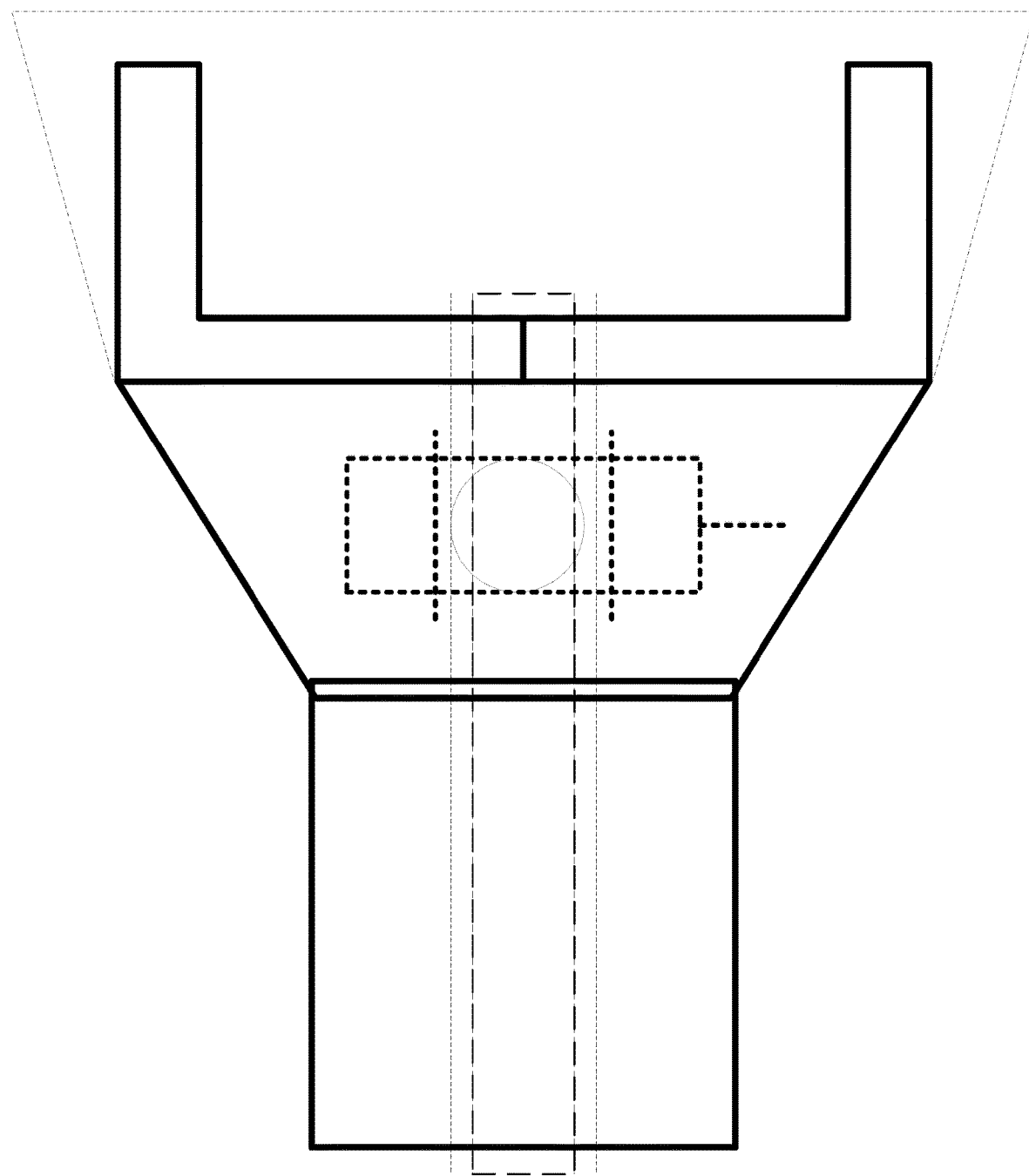
FIG. 2 depicts an example housing handle of the example LPNG of FIG. 1, in accordance with some embodiments.

FIG. 2 depicts the housing handle including a support portion and a through hole extending vertically through the top of the housing handle and the bottom of the housing handle.

Figure 3:
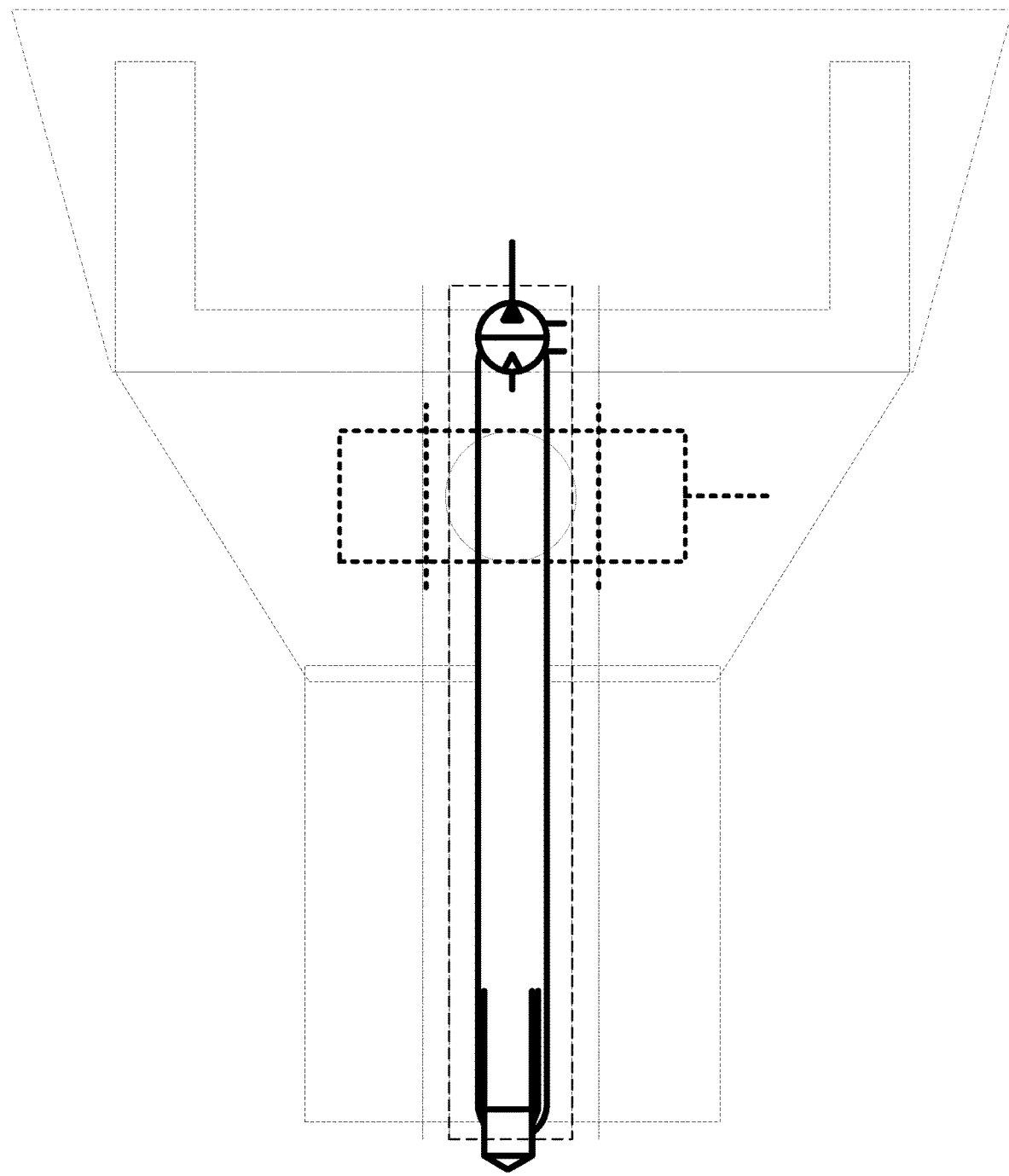
FIG. 3 depicts an example hose of the example LPNG of FIG. 1, in accordance with some embodiments.

FIG. 3 depicts the hose extending through the through hole of the housing handle, wherein the hose comprises an actuator affixed to a first end of the hose and a connector affixed to a second end of the hose.

In at least one embodiment, as disclosed in FIG. 1, the actuator affixed to the first end of the hose intensifies lubricant from the lubricant source. The connector affixed to the second end of the hose connects to a lubricant source.

Figure 4:
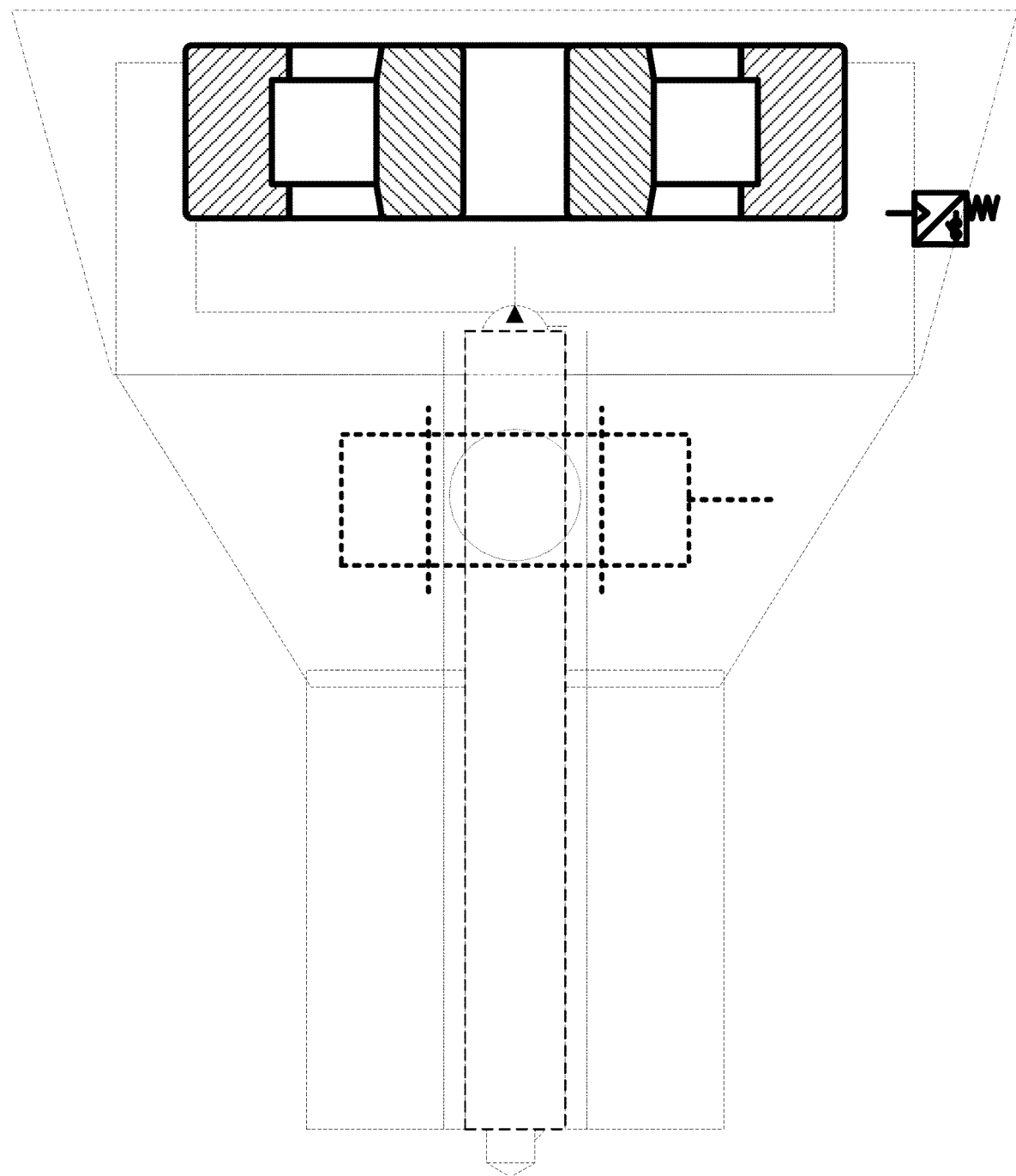
FIG. 4 depicts an example cylindrical roller of the example LPNG of FIG. 1, in accordance with some embodiments.

FIG. 4 depicts the cylindrical roller axially mounted on the support portion of the housing handle and a detach mechanism.

In at least one embodiment, as disclosed in FIG. 1, the cylindrical roller is propelled by the intensified lubricant from the actuator.

In another embodiment, the cylindrical roller is comprised of an abrasive surface.

In another embodiment, the cylindrical roller is comprised of a polishing surface.

In another embodiment, the detach mechanism detaches the cylindrical roller from the support portion of the housing handle.

Figure 5:
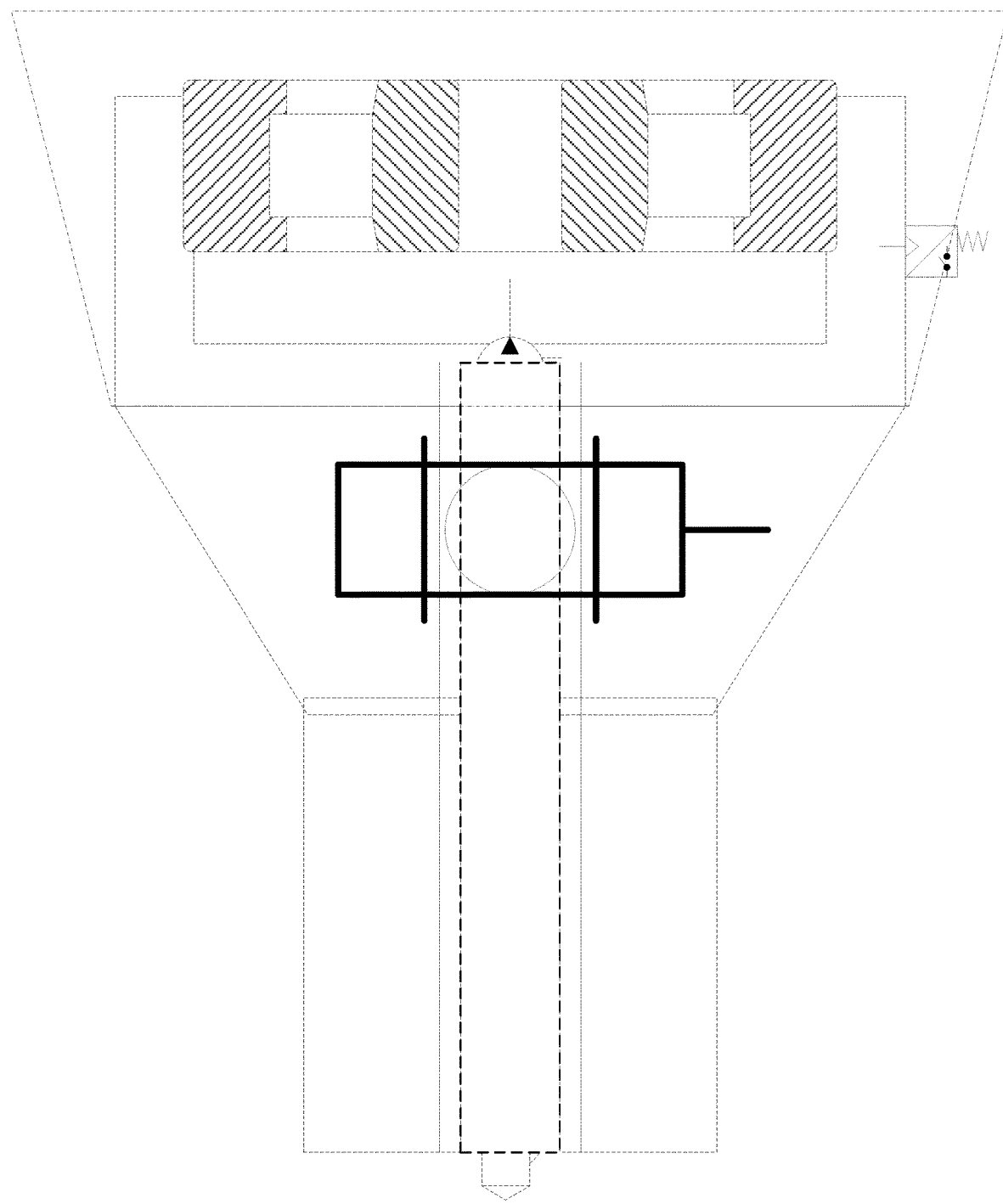
FIG. 5 depicts an example motor of the example LPNG of FIG. 1, in accordance with some embodiments.

FIG. 5 depicts an example motor of the example LPNG of FIG. 1, in accordance with some embodiments.

In another embodiment, the motor facilitates forward motion.

In another embodiment, the motor facilitates reverse motion.

Figure 6:
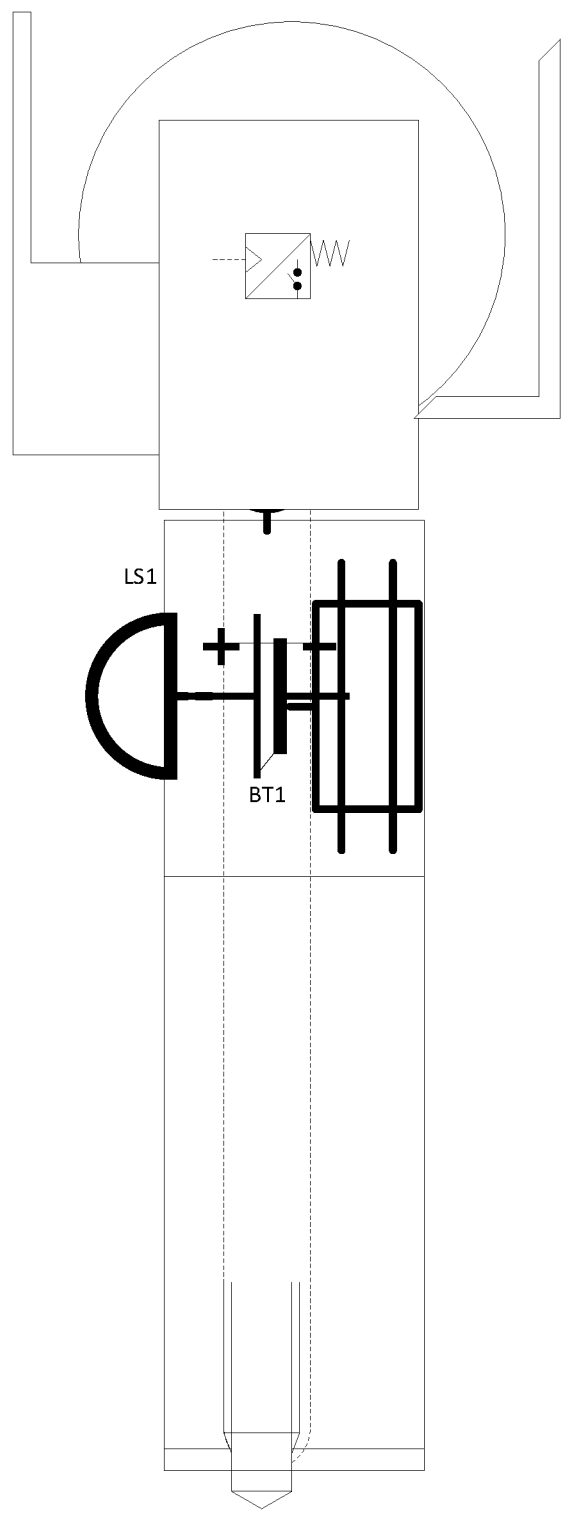
FIG. 6 depicts an example power source and an example trigger mechanism of the example motor of FIG. 5, in accordance with some embodiments.

FIG. 6 depicts an example power source and an example trigger mechanism of the example motor of FIG. 5, in accordance with some embodiments.

In another embodiment, the trigger mechanism activates the motor.

Figure 7:
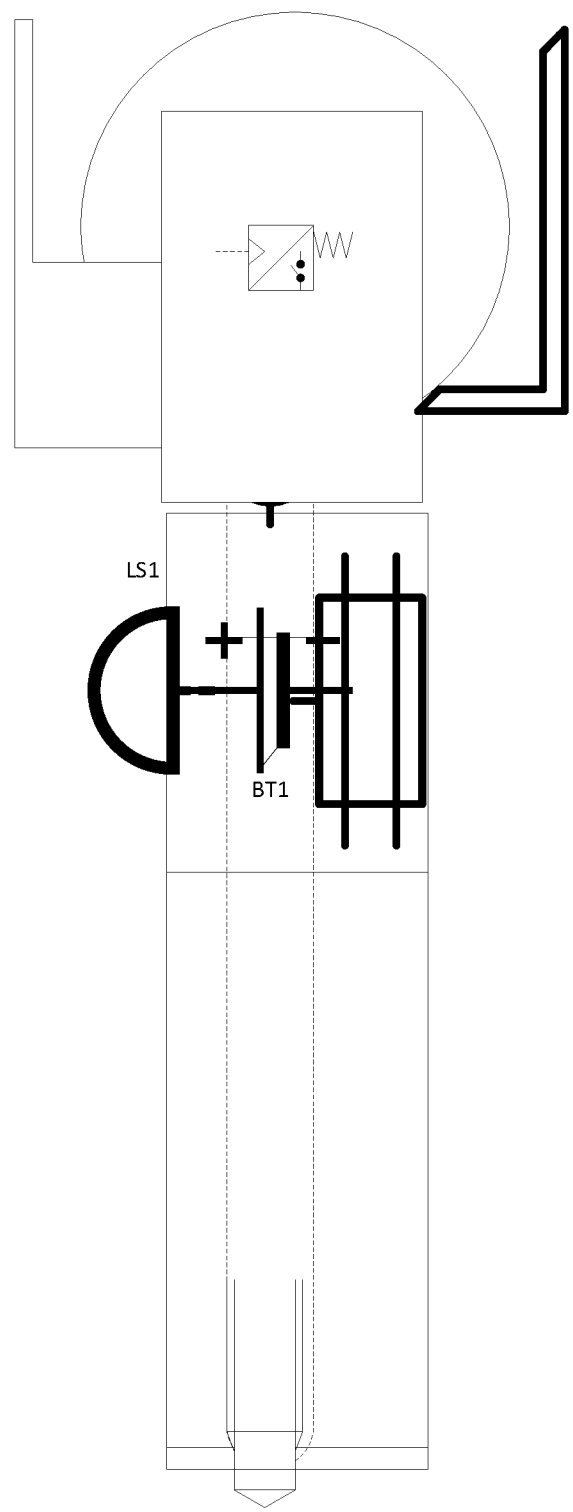
FIG. 7 depicts an example nail-pad separator of the example LPNG of FIG. 1, in accordance with some embodiments.

FIG. 7 depicts an example nail-pad separator of the example LPNG of FIG. 1, in accordance with some embodiments.

In another embodiment, the nail-pad separator provides nail pad separation during operation of the cylindrical roller.

In another embodiment, the nail-pad separator is detachable.

In another embodiment, the nail-pad separator is a customized-nail-size-pad separator customized to the size of a pet.

In another embodiment, the nail-pad separator is a customized-nail-type-pad separator customized to a pet's nail type.

In another embodiment, the nail-pad separator is replaceable with the customized-nail-size-pad separator.

In another embodiment, the nail-pad separator is replaceable with the customized-nail-type-pad separator.

Figure 8:
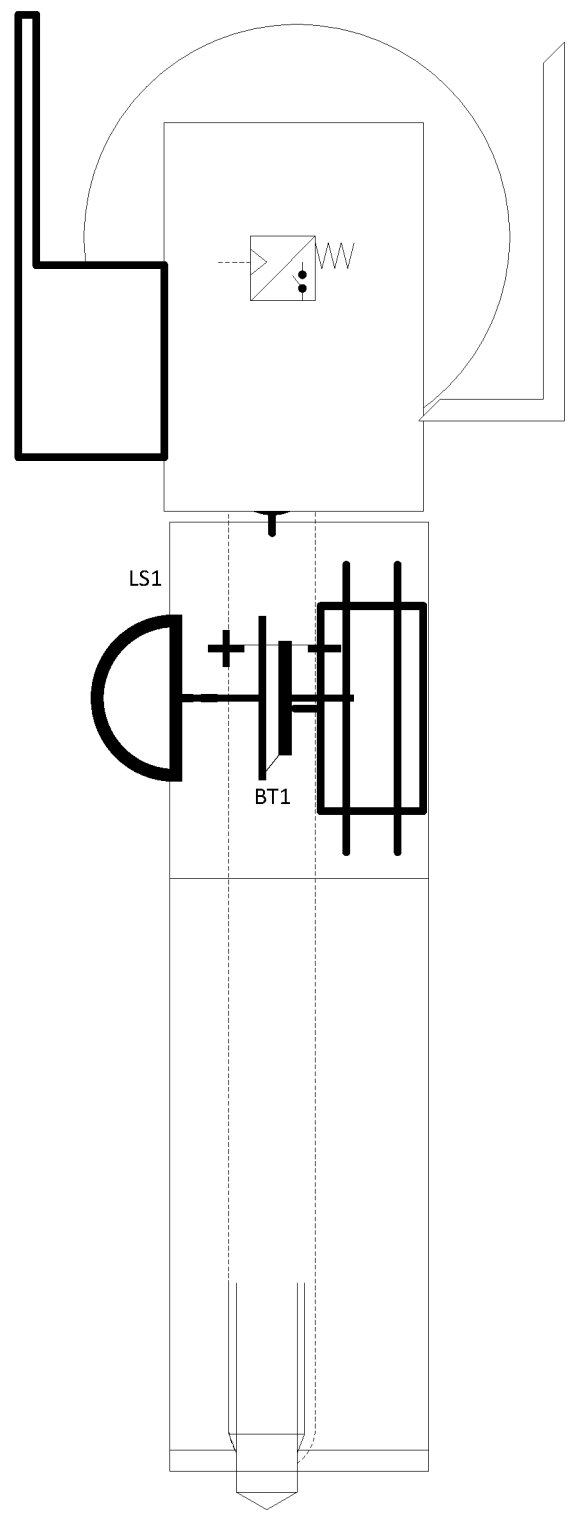
FIG. 8 depicts an example shield of the example LPNG of FIG. 1, in accordance with some embodiments.

FIG. 8 depicts an example shield of the example LPNG of FIG. 1, in accordance with some embodiments In another embodiment, the shield protects from debris.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A lubricated-pet-nail grinder comprising:
   a housing handle comprising:
      a support portion affixed on a top portion of the housing handle and a through hole extending vertically through the top portion of the housing handle and a bottom portion of the housing handle;
   a hose extending through the through hole of the housing handle, wherein the hose comprises a connector affixed to a first end of the hose extending through the bottom portion of the housing handle and an actuator affixed to a second end of the hose extending through the top portion of the housing handle;
   a lubricant;
   a lubricant source;
   a cylindrical roller axially mounted on the support portion of the housing handle;
   a motor mounted within the interior of the housing handle;
   a nail-pad separator affixed to a rear side of the support portion of the housing handle; and
   a shield affixed to a front side of the support portion of the housing handle.

2. The lubricated-pet-nail grinder of claim 1, wherein the connector affixed to the second end of the hose connects to the lubricant source.

3. The lubricated-pet-nail grinder of claim 1, wherein the actuator affixed to the first end of the hose intensifies the lubricant flowing through the hose from the lubricant source.

4. The lubricated-pet-nail grinder of claim 1, wherein the lubricant is a liquid substance.

5. The lubricated-pet-nail grinder of claim 1, wherein the cylindrical roller is propelled by the motor.

6. The lubricated-pet-nail grinder of claim 1, wherein the cylindrical roller is comprised of an abrasive surface.

7. The lubricated-pet-nail grinder of claim 1, wherein the cylindrical roller is comprised of a polishing surface.

8. The lubricated-pet-nail grinder of claim 1, wherein the nail-pad separator provides nail pad separation during operation of the cylindrical roller.

9. The lubricated-pet-nail grinder of claim 1, wherein the shield protects from debris during operation of the cylindrical roller.

10. The lubricated-pet-nail grinder of claim 1, wherein the motor is connected to a power source.

11. A method of pet-nail grinding comprising:
    grinding pet nails using a housing handle comprising:
       a support portion affixed on a top portion of the housing handle and a through hole extending vertically through the top portion of the housing handle and a bottom portion of the housing handle;
       a hose extending through the through hole of the housing handle, wherein the hose comprises a connector affixed to a first end of the hose extending through the bottom portion of the housing handle and an actuator affixed to a second end of the hose extending through the top portion of the housing handle;
       a lubricant;
       a lubricant source;
       a cylindrical roller axially mounted on the support portion of the housing handle;
       a motor mounted within the interior of the housing handle;
       a nail-pad separator affixed to a rear side of the support portion of the housing handle;
       a shield affixed to a front side of the support portion of the housing handle; and
       applying the lubricant flowing through the connector affixed to the first end of the hose and the actuator affixed to the second end of the hose to prevent heating of the cylindrical roller caused by friction.

12. The method of pet-nail grinding of claim 11, wherein the connector affixed to the second end of the hose connects to the lubricant source.

13. The method of pet-nail grinding of claim 11, wherein the actuator affixed to the first end of the hose intensifies the lubricant flowing through the hose from the lubricant source.

14. The method of pet-nail grinding of claim 11, wherein the lubricant is a liquid substance.

15. The method of pet-nail grinding of claim 11, wherein the cylindrical roller is propelled by the motor.

16. The method of pet-nail grinding of claim 11, wherein the cylindrical roller is comprised of an abrasive surface.

17. The method of pet-nail grinding of claim 11, wherein the cylindrical roller is comprised of a polishing surface.

18. The method of pet-nail grinding of claim 11, wherein the nail-pad separator provides nail pad separation during operation of the cylindrical roller.

19. The method of pet-nail grinding of claim 11, wherein the shield protects from debris during operation of the cylindrical roller.

20. An article of manufacture lubricated-pet-nail grinder comprising:
    a housing handle comprising:
       a support portion affixed on a top portion of the housing handle and a through hole extending vertically through the top portion of the housing handle and a bottom portion of the housing handle;
    a hose extending through the through hole of the housing handle, wherein the hose comprises a connector affixed to a first end of the hose extending through the bottom portion of the housing handle and an actuator affixed to a second end of the hose extending through the top portion of the housing handle;
    a lubricant;
    a lubricant source;
    a cylindrical roller axially mounted on the support portion of the housing handle;
    a motor mounted within the interior of the housing handle;
    a nail-pad separator affixed to a rear side of the support portion of the housing handle; and
    a shield affixed to a front side of the support portion of the housing handle.

* * * * *